US009965867B2

(12) United States Patent
Otsu et al.

(10) Patent No.: US 9,965,867 B2
(45) Date of Patent: May 8, 2018

(54) PARTICLE CONTROL DEVICE

(71) Applicant: HAMAMATSU PHOTONICS K.K., Hamamatsu-shi, Shizuoka (JP)

(72) Inventors: Tomoko Otsu, Hamamatsu (JP); Taro Ando, Hamamatsu (JP); Hiroyasu Itoh, Hamamatsu (JP); Haruyoshi Toyoda, Hamamatsu (JP); Yoshiyuki Ohtake, Hamamatsu (JP); Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 176 days.

(21) Appl. No.: 15/031,802

(22) PCT Filed: Oct. 2, 2014

(86) PCT No.: PCT/JP2014/076432
§ 371 (c)(1),
(2) Date: Apr. 25, 2016

(87) PCT Pub. No.: WO2015/064295
PCT Pub. Date: May 7, 2015

(65) Prior Publication Data
US 2016/0247291 A1  Aug. 25, 2016

(30) Foreign Application Priority Data

Nov. 1, 2013 (JP) .................. 2013-228323

(51) Int. Cl.
*G06T 7/20* (2017.01)
*G02B 21/32* (2006.01)
(Continued)

(52) U.S. Cl.
CPC ........ *G06T 7/204* (2013.01); *B01L 3/502761* (2013.01); *G02B 7/04* (2013.01);
(Continued)

(58) Field of Classification Search
CPC ... G06T 7/204; G06T 7/248; B01L 3/502761; G02B 7/04; G02B 21/32; G02B 27/0927; G02F 1/1313
See application file for complete search history.

(56) References Cited

U.S. PATENT DOCUMENTS

2003/0132373 A1* 7/2003 Curtis ................. B01F 13/0052
250/251
2005/0048581 A1* 3/2005 Chiu ................. B01L 3/502761
435/7.1
(Continued)

FOREIGN PATENT DOCUMENTS

CN 102519862 6/2012
CN 202522760 11/2012
(Continued)

OTHER PUBLICATIONS

Jonathan Leach, "Comparison of Faxen's correction for a microsphere translating or rotating near a surface," Physical Review E, Feb. 2009, pp. 026301-1-026301-4, vol. 79.
(Continued)

*Primary Examiner* — Hung Dang
*Assistant Examiner* — Sunghyoun Park
(74) *Attorney, Agent, or Firm* — Drinker Biddle & Reath LLP

(57) ABSTRACT

A micro object control apparatus for controlling motion of a micro object within a medium includes a light source, an optical vortex generation unit, an objective lens, an imaging unit, an analysis unit, and a movement unit. The analysis unit acquires first motion information of the micro object based on the image data in which the micro object optically trapped with the optical vortex is imaged by setting the focal position of the optical vortex to a first position, acquires second motion information of the micro object based on the image data in which the micro object optically trapped with
(Continued)

the optical vortex is imaged by setting the focal position of the optical vortex to a second position, and evaluates a state of an optical trap of the micro object with the optical vortex by comparing the first motion information and the second motion information.

6 Claims, 7 Drawing Sheets

(51) Int. Cl.
| | |
|---|---|
| *B01L 3/00* | (2006.01) |
| *G02B 7/04* | (2006.01) |
| *G02B 27/09* | (2006.01) |
| *G02F 1/13* | (2006.01) |
| *G21K 1/00* | (2006.01) |
| *H04N 5/232* | (2006.01) |
| *G06T 7/246* | (2017.01) |

(52) U.S. Cl.
CPC ......... *G02B 21/32* (2013.01); *G02B 27/0927* (2013.01); *G02F 1/1313* (2013.01); *G06T 7/248* (2017.01); *G21K 1/006* (2013.01); *H04N 5/23212* (2013.01); *B01L 2300/0822* (2013.01); *B01L 2400/0454* (2013.01); *G06T 2207/10148* (2013.01); *G06T 2207/10152* (2013.01); *G06T 2207/30241* (2013.01)

(56) References Cited

U.S. PATENT DOCUMENTS

| | | |
|---|---|---|
| 2008/0137161 A1 | 6/2008 | Roichman et al. |
| 2016/0202090 A1* | 7/2016 | Cvijetic ............ G01S 17/66 |
| | | 356/614 |

FOREIGN PATENT DOCUMENTS

| | | |
|---|---|---|
| CN | 102959452 | 3/2013 |
| JP | 2006-500237 | 1/2006 |
| JP | 2008-216641 A | 9/2008 |
| WO | WO 2007/013648 | 2/2007 |

OTHER PUBLICATIONS

A.T. O'Neil et al., "Intrinsic and Extrinsic Nature of the Orbital Angular Momentum of a Light Beam," Physical Review Letters, Feb. 4, 2002, pp. 053601-1-053601-4, vol. 88, No. 5.

M.E.J. Friese et al., "Optically driven micromachine elements," Applied Physics Letters, Jan. 22, 2001, pp. 547-549, vol. 78, No. 4.

Erwin J.G. Peterman et al., "Laser-Induced Heating in Optical Traps," Biophysical Journal, Feb. 2003, pp. 1308-1316, vol. 84.

Jennifer E. Curtis et al., Structure of Optical Vortices, Physical Review Letters, Apr. 3, 2003, pp. 133901-1-133901-4, vol. 90, No. 13.

International Preliminary Report on Patentability dated May 3, 2016 for PCT/JP2014/076432.

* cited by examiner

PARTICLE CONTROL DEVICE

TECHNICAL FIELD

The present invention relates to an apparatus for controlling motion of a micro object in a medium.

BACKGROUND ART

There has been known a technique of optically trapping a micro object by irradiating the micro object in a medium with a focused optical vortex (refer to Patent Literature 1 and Non-Patent Literature 1). The optical vortex has a phase singularity on a propagation axis, has a light intensity of zero on the propagation axis, and has a doughnut-shaped light intensity distribution in which the light intensity is at a maximum at a certain distance from the propagation axis.

In addition to the doughnut-shaped light intensity distribution, the optical vortex is also distinctive in that it has an orbital angular momentum. When the micro object in the medium is irradiated with the optical vortex which has the orbital angular momentum, the micro object receives the angular momentum from the optical vortex to revolve around the propagation axis along an orbit having the large light intensity. That is, the optical vortex is capable of optically trapping the micro object in the medium as well as of controlling motion of the micro object.

CITATION LIST

Patent Literature

Patent Literature 1: Japanese Patent Application Laid-Open Publication No. 2008-216641

Non Patent Literature

Non-Patent Literature 1: Jennifer E. Curtis and David G. Grier, "Structure of Optical Vortices", Phys. Rev. Lett. 90, pp. 133901-1-133901-4 (2003)
Non-Patent Literature 2: Leach, J., Mushfique, H., Keen, S., Di Leonardo, R., Ruocco, G., Cooper, J. M., and Padgett, M. J., "Comparison of Faxen's correction for a microsphere translating or rotating near a surface", Phys. Rev. E 79, pp. 026301-1-026301-4 (2009)
Non-Patent Literature 3: Peterman, E. J. G., Gittes, F., and Schmidt, C. F., "Laser-Induced Heating in Optical Traps", Biophys. J. 84, pp. 1308-1316 (2003)

SUMMARY OF INVENTION

Technical Problem

In the conventional technique, however, it is not possible to evaluate whether or not the micro object in the medium is optically trapped with the optical vortex accurately.

The present invention has been made in order to solve the above problem, and an object thereof is to provide a micro object control apparatus capable of evaluating a state of an optical trap of a micro object with an optical vortex.

Solution to Problem

A micro object control apparatus according to the present invention is an apparatus for controlling motion of a micro object in a medium, and the apparatus includes a light source for outputting light; an optical vortex generation unit for inputting the light output from the light source, generating and outputting an optical vortex; an objective lens for optically trapping the micro object by focusing the optical vortex output from the optical vortex generation unit and irradiating the micro object in the medium with the focused optical vortex; an imaging unit for capturing an image of the micro object through the objective lens and outputting image data; an analysis unit for analyzing the motion of the micro object based on the image data output from the imaging unit; and a movement unit for moving a focal position of the optical vortex by the objective lens in an optical axis direction of the objective lens.

Further, in the micro object control apparatus according to the present invention, the analysis unit acquires first motion information of the micro object based on the image data output from the imaging unit in which the micro object optically trapped with the optical vortex is imaged by setting the focal position of the optical vortex by the objective lens to a first position by the movement unit, acquires second motion information of the micro object based on the image data output from the imaging unit in which the micro object optically trapped with the optical vortex is imaged by setting the focal position of the optical vortex by the objective lens to a second position different from the first position with respect to the optical axis direction by the movement unit, and evaluates a state of an optical trap of the micro object with the optical vortex by comparing the first motion information and the second motion information.

Advantageous Effects of Invention

In the micro object control apparatus according to the present invention, it is possible to evaluate the state of the optical trap of the micro object with the optical vortex.

DESCRIPTION OF EMBODIMENTS

An embodiment for carrying out the present invention will be described below in detail with reference to the accompanying drawings. Note that, in the description of the drawings, the same elements will be denoted by the same reference signs, without redundant description.

Figure 1:
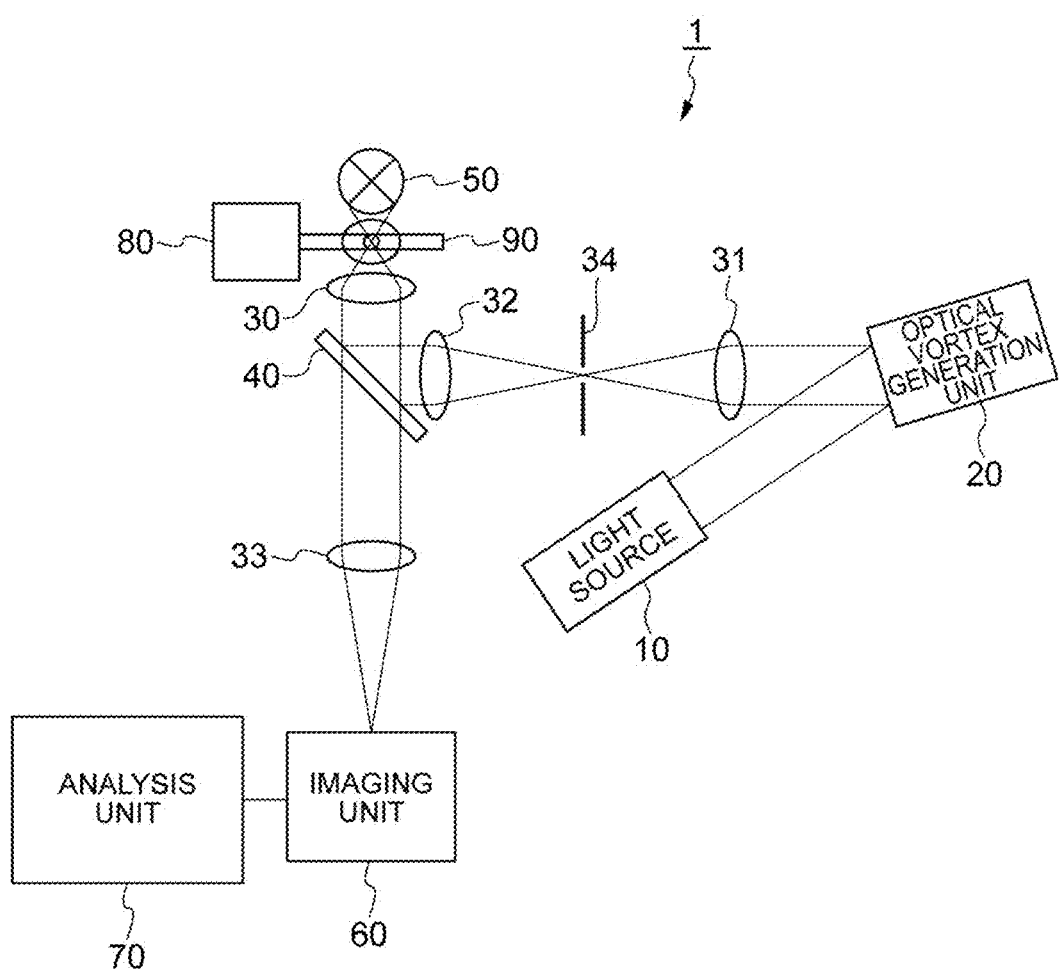
FIG. 1 is a view illustrating a configuration of a micro object control apparatus 1.

FIG. 1 is a view illustrating a configuration of a micro object control apparatus 1. The micro object control apparatus 1 is an apparatus that controls motion of a micro object within a medium in a sample 90, and includes a light source 10, an optical vortex generation unit 20, lenses 30 to 33, an aperture 34, a dichroic mirror 40, an illumination unit 50, an imaging unit 60, an analysis unit 70, and a movement unit 80.

The medium in the sample 90 is a liquid or a gas. A shape of the micro object in the medium (a minute target object to be controlled) may be arbitrary, and for example, the shape may be a sphere, a cube, a circular cone, or the like. A material of the micro object may also be arbitrary, and for example, the material may be a polystyrene bead, glass, crystal, or the like. The micro object has a size and a weight at a level to enable the micro object to be optically trapped by an optical vortex in the medium.

The light source 10 outputs light. It is preferred that the light source 10 be a laser light source, for example. It is preferred that the light output from the light source 10 have a wavelength such that heat absorption by the medium in the sample 90 is small.

The optical vortex generation unit 20 is input with the light that has been output from the light source 10, and generates and outputs the optical vortex. The optical vortex, which has been generated by the optical vortex generation unit 20, is a light beam having a spiral wavefront and is, for example, a Laguerre-Gaussian beam or a Bessel beam. As the optical vortex generation unit 20, for example, a diffractive optical element, a spatial light modulator, or the like are suitably used.

The spatial light modulator has a plurality of pixels that are two-dimensionally arrayed, and is capable of modulating and outputting an amplitude and a phase of the light in each of the pixels. By using such spatial light modulator as the optical vortex generation unit 20, it is possible to easily generate the optical vortex in various forms without changing an optical system, whereby it is possible to make various evaluations on a state of an optical trap of the micro object. The spatial light modulator used as the optical vortex generation unit 20 may be of a transmission type or a reflection type, and in a case where the latter is used, the spatial light modulator may also be an LCOS-SLM (Liquid Crystal on Silicon-Spatial Light Modulator). In FIG. 1, the reflection type spatial light modulator is illustrated as the optical vortex generation unit 20. Note that in FIG. 1, the light obliquely enters the optical vortex generation unit 20, however, the light may also enter the optical vortex generation unit 20 at a nearly vertical angle.

The lens 31, the aperture 34, the lens 32, the dichroic mirror 40, and the objective lens 30 guide the optical vortex, which has been output from the optical vortex generation unit 20, to the micro object in the medium in the sample 90. The lens 31 and the lens 32 are set such that a modulation plane of the optical vortex generation unit 20 and a pupil plane of the objective lens 30 are in a mutually conjugate positional relationship, whereby an amplitude distribution and a phase distribution of the optical vortex output from the optical vortex generation unit 20 are image-formed near the pupil plane of the objective lens 30.

The dichroic mirror 40 reflects the optical vortex output from the optical vortex generation unit 20. The objective lens 30 optically traps the micro object by focusing the optical vortex output from the optical vortex generation unit 20 and irradiating the micro object in the medium in the sample 90 with the focused optical vortex. Note that it is also possible to control a revolving shape (circle, ellipse) of the micro object by arranging a λ/4 plate or a λ/2 plate on an optical path of the optical vortex before entering the objective lens 30.

The illumination unit 50, which is provided on an opposite side of the objective lens 30 interposing the sample 90, outputs illumination light to the sample 90. It is preferred that the illumination unit 50 output light having a wavelength different from the wavelength of the light output from the light source 10. As the illumination unit 50, for example, a white light source, a mercury lamp, a laser light source, or the like may be used.

The imaging unit 60 captures an image of the micro object in the sample 90, which is illuminated by the illumination unit 50, through the objective lens 30, the dichroic mirror 40, and the lens 33 and outputs image data. As the imaging unit 60, for example, a CCD camera, a CMOS camera, or the like may be used. The dichroic mirror 40 transmits the light from the sample 90, which is illuminated by the illumination unit 50.

The analysis unit 70 analyzes motion of the micro object in the sample 90 based on the image data output from the imaging unit 60. As the analysis unit 70, for example, a personal computer or the like may be used.

The movement unit 80 moves a focal position of the optical vortex by the objective lens 30 in an optical axis direction of the objective lens 30. The movement unit 80 may move the objective lens 30, or may move the sample 90. The movement unit 80 may also move the focal position of the optical vortex by the objective lens 30 by presenting a Fresnel lens pattern in the spatial light modulator as the optical vortex generation unit 20. Furthermore, the movement unit 80 may move the focal position of the optical vortex by the objective lens 30 in a direction perpendicular to an optical axis of the objective lens 30. Specifically, for example, it is preferred that the movement unit 80 include a piezoelectric element capable of making a fine adjustment of a movement amount of the focal position of the optical vortex.

Figure 2:
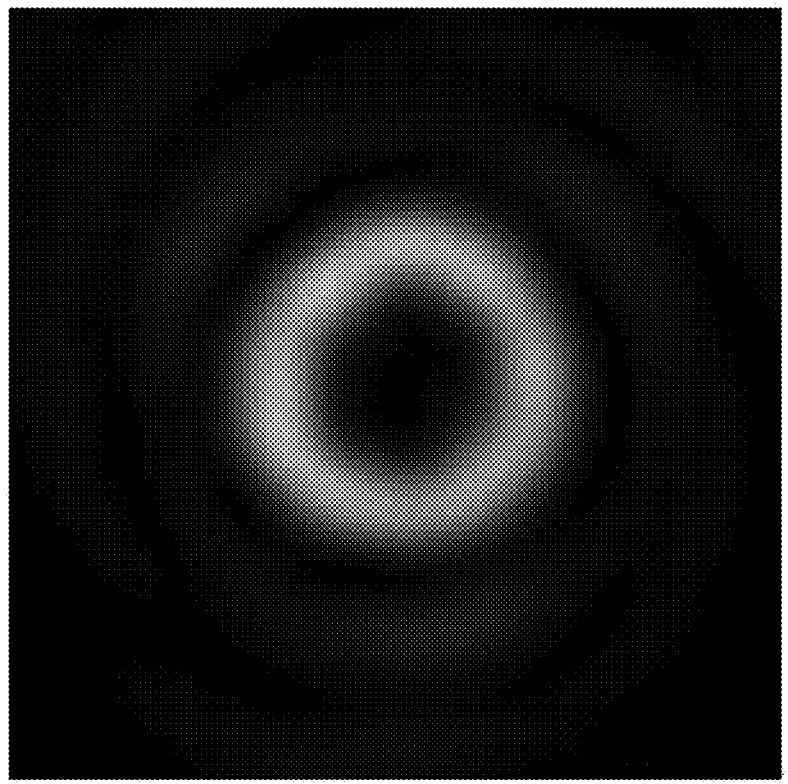
FIG. 2 is a view illustrating an example of an intensity distribution of an optical vortex.

FIG. 2 is a view illustrating an example of an intensity distribution of the optical vortex. In FIG. 2, light intensity is illustrated in gradation, and it is indicated that the light intensity is larger as it is whiter. As illustrated in FIG. 2, the optical vortex has a doughnut-shaped light intensity distribution in which the light intensity becomes the maximum at a certain distance from a propagation axis.

Figure 3:
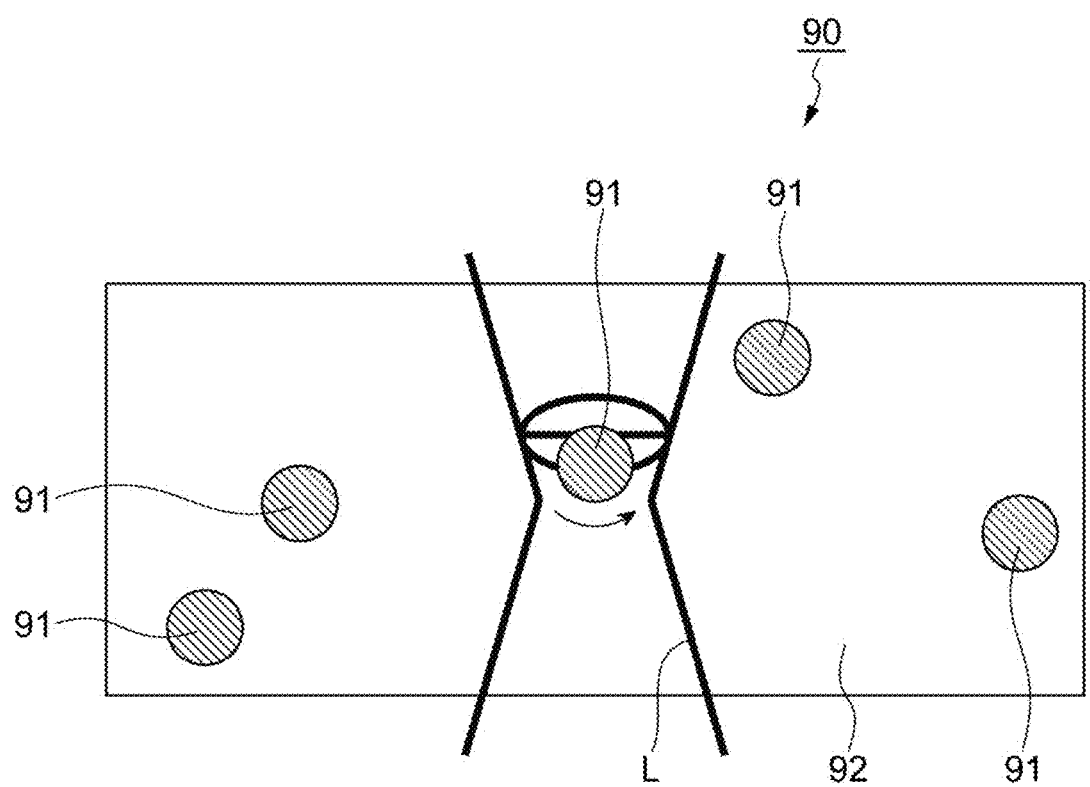
FIG. 3 is a view describing an optical trap of a micro object 91 with the optical vortex.
Figure 4:
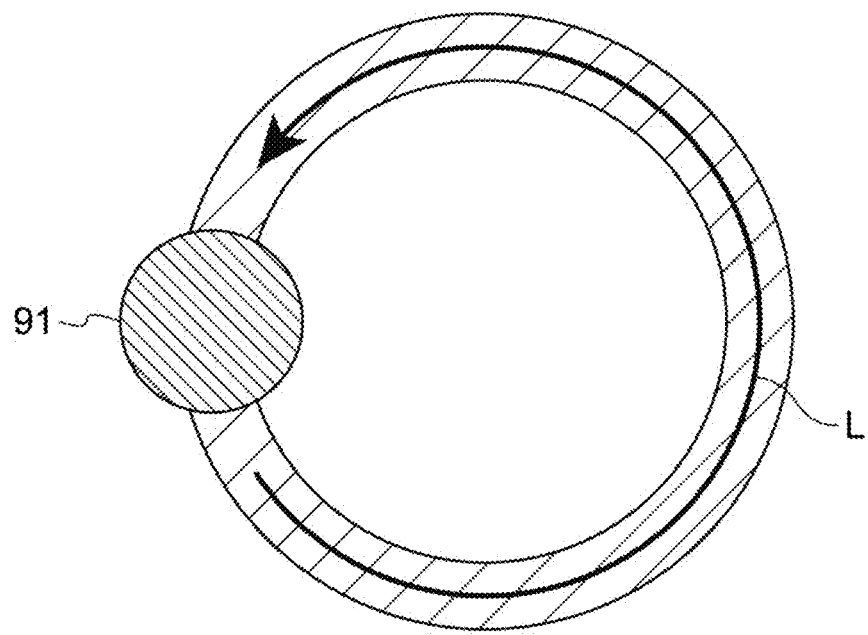
FIG. 4 is a view describing the optical trap of the micro object 91 with the optical vortex.

FIG. 3 and FIG. 4 are views for describing the optical trap of the micro object 91 with the optical vortex. FIG. 3 is a view in a direction perpendicular to the propagation axis of the optical vortex L. FIG. 4 is a view in a propagation axis direction of the optical vortex L, and hatching is applied to a doughnut-shaped region where the light intensity of the optical vortex L is large. By irradiating the sample 90 with the focused optical vortex L, the optical vortex L is capable of optically trapping the micro object 91 within the medium 92 in the sample 90, as well as causing the micro object 91 to revolve around the propagation axis. The revolving motion of the micro object 91 is a circular motion or an elliptic motion.

In this embodiment, a state of the optical trap of the micro object 91 by the optical vortex is evaluated as follows. The movement unit 80 sets the focal position of the optical vortex by the objective lens 30 to a first position. In a state where the focal position is set to the first position, the imaging unit 60 images the micro object 91, which is optically trapped with the optical vortex, and outputs the image data, and the analysis unit 70 acquires first motion information of the micro object 91 based on the image data.

Further, the movement unit 80 sets the focal position of the optical vortex by the objective lens 30 to a second position that is different from the first position with respect to the optical axis direction. In a state where the focal position is set to the second position, the imaging unit 60 images the micro object 91, which is optically trapped with the optical vortex, and outputs the image data, and the analysis unit 70 acquires second motion information of the micro object 91 based on the image data. Then, by comparing the first motion information and the second motion information, the analysis unit 70 evaluates the state of the optical trap of the micro object 91 with the optical vortex.

Preferably, the first motion information and the second motion information of the micro object 91 are at least any one of a velocity, an angular velocity, an acceleration, a revolution radius, and a physical quantity calculated from these values, of the micro object 91. Specifically, for example, in comparing the first motion information and the second motion information, the analysis unit 70 evaluates whether or not a difference between the first motion information and the second motion information is a predetermined value or less. For example, in the case of the revolution radius, the analysis unit 70 evaluates the state of the optical trap of the micro object 91 depending on whether or not a difference of the revolution radius between the first motion information and the second motion information is in a range of ±5%.

Next, an example is described. In the optical vortex generation unit 20 according to this example, the spatial light modulator is used, and a hologram to be displayed is designed by a Kirk-Jones method. Design parameters are set to an azimuthal index of 3, a radial index of 0, and a beam size of 1.42 mm in radius. It is preferred that a beam size be such that a radius of the optical vortex generated on the pupil plane is 20% or more relative to a radius of the pupil plane. Furthermore, in the sample 90 according to this example, a polystyrene bead having a diameter of 0.75 μm is used as the micro object 91, and pure water is used as the medium 92. A ring-shaped spacer is sandwiched with two glass plates, and the micro object and the medium are put in a space formed thereby. Then, the micro object (polystyrene bead) floating in the medium (pure water) is optically trapped with the optical vortex that is focused with, for example, magnification of 100 (NA of 1.30) by the objective lens 30.

The focal position of the optical vortex is set to the first position by the movement unit 80, the micro object 91 optically trapped with the optical vortex is imaged by the imaging unit 60, and the image data thereof is output, and based on the image data, the first motion information of the micro object 91 is acquired by the analysis unit 70. Further, the focal position of the optical vortex is set to the second position, which is different from the first position, by the movement unit 80, the micro object 91 optically trapped with the optical vortex is imaged by the imaging unit 60, and the image data thereof is output, and based on the image data, the second motion information of the micro object 91 is acquired by the analysis unit 70.

Figure 5:
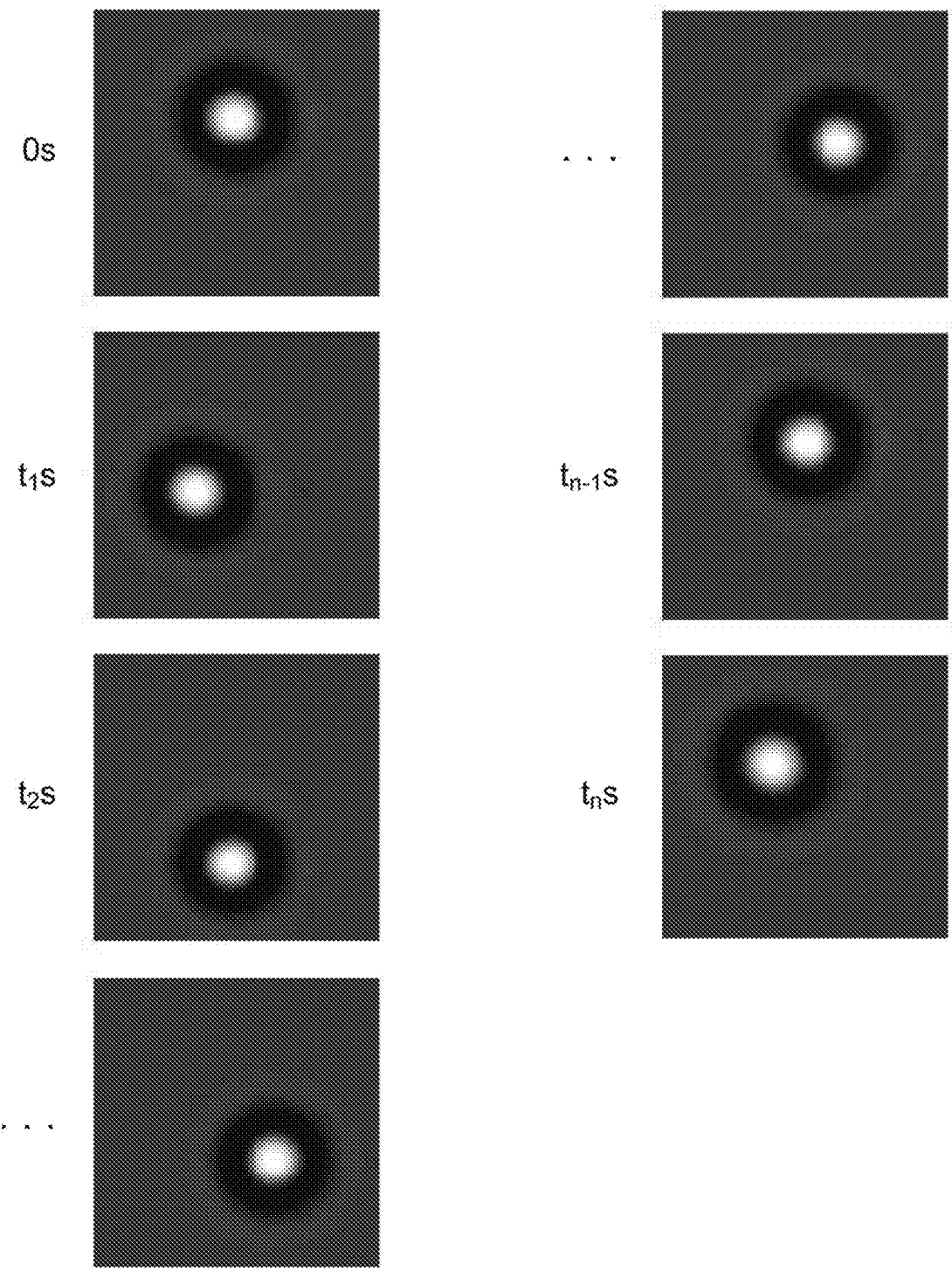
FIG. 5 is a view illustrating an example of image data output from an imaging unit 60 in which the micro object 91 is imaged by setting a focal position of the optical vortex to a certain position in an example.

FIG. 5 is a view illustrating an example of image data that is output from the imaging unit 60, in which the micro object 91 is imaged by setting the focal position of the optical vortex to a certain position according to the example. As illustrated in FIG. 5, it is recognizable that the micro object 91 moves and makes a revolving motion with a lapse of time $(0 \to t_1 \to t_2 \to \ldots \to t_{n-1} \to t_n)$.

Figure 6:
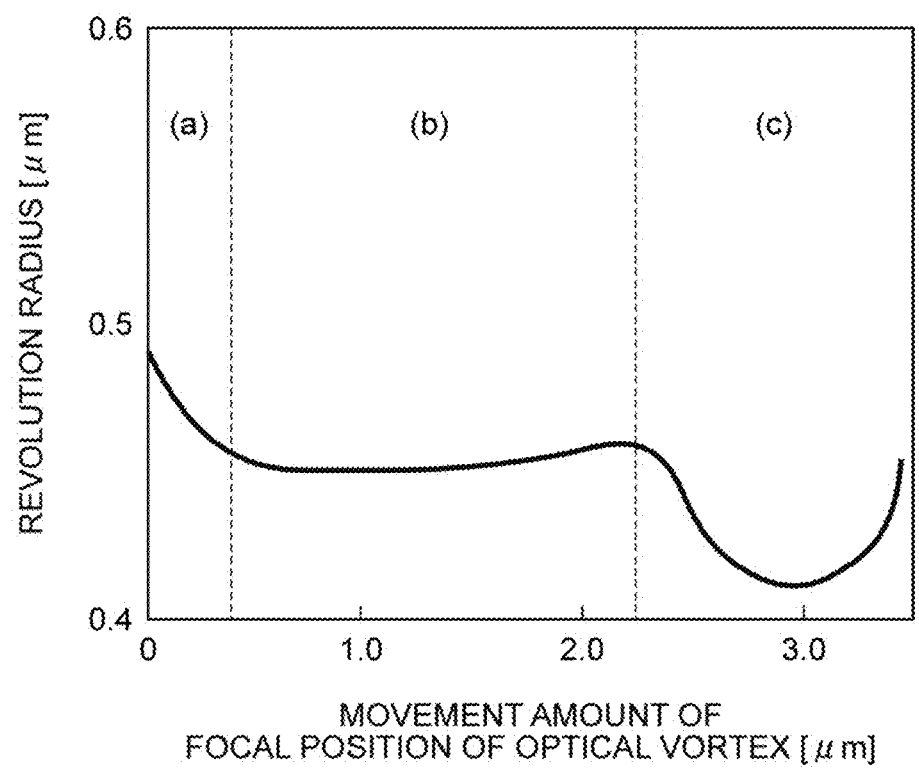
FIG. 6 is a graph illustrating a relationship between a movement amount of the focal position of the optical vortex and a revolution radius of the micro object in the example.
Figure 7:
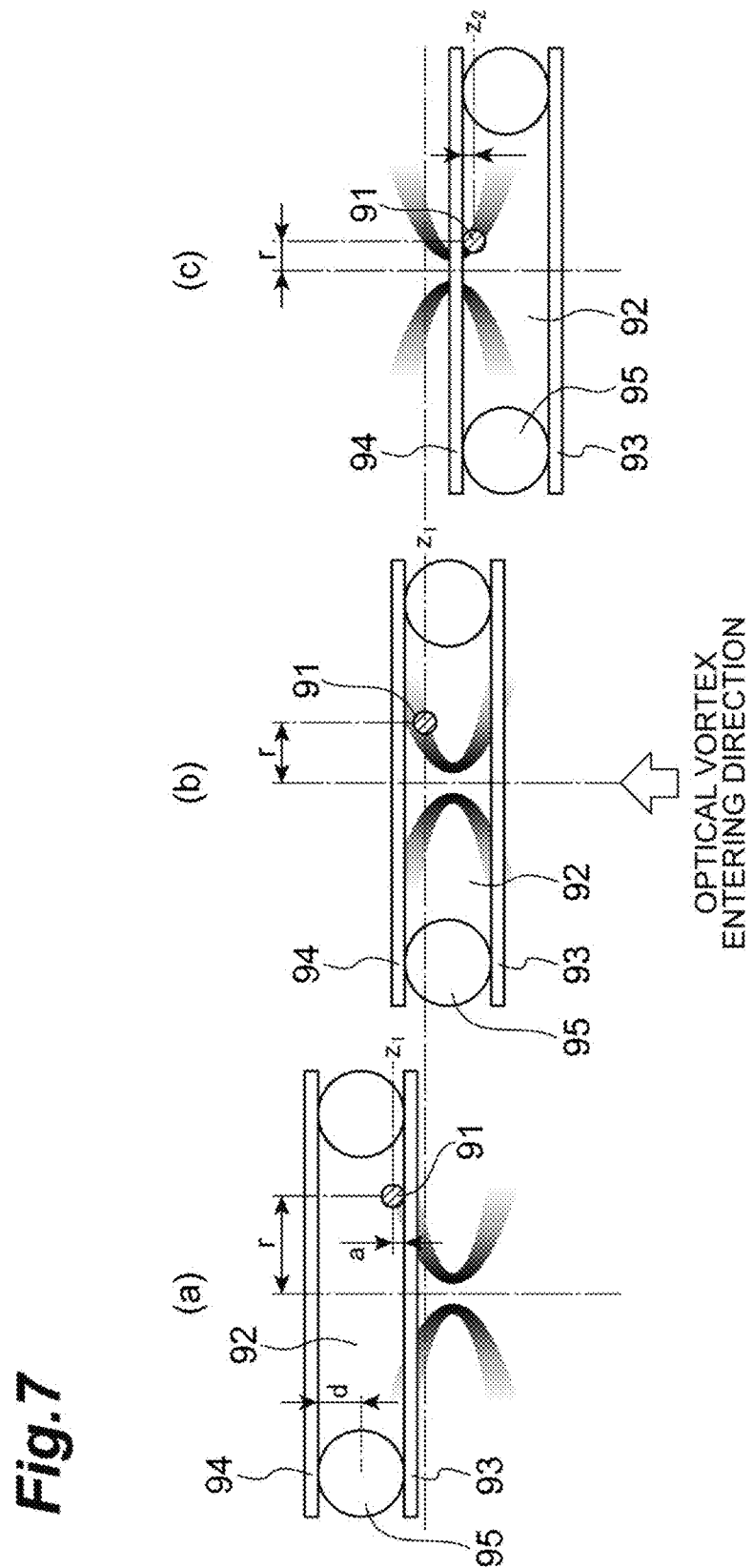
FIG. 7 includes (a)-(c) views describing the relationship between the movement amount of the focal position of the optical vortex and the revolution radius of the micro object in the example.

FIG. 6 is a graph illustrating a relationship between the movement amount of the focal position of the optical vortex and the revolution radius of the micro object in the example. (a) to (c) in FIG. 7 are views describing the relationship between the movement amount of the focal position of the optical vortex and the revolution radius of the micro object in the example. As illustrated in FIG. 7, a ring-shaped spacer 95 is sandwiched with two glass plates 93 and 94, and the micro object 91 and the medium 92 are put in the space formed thereby.

When the micro object 91 is optically trapped with the optical vortex, a change of a revolution radius r of the micro object 91 is small even when the focal position of the optical vortex is moved in the optical axis direction ((b) in FIG. 6 and (b) in FIG. 7). In contrast, when the micro object 91 is positioned close to the glass plate 93 or 94 or is in contact with the plate ((a) and (c) in FIG. 7), the change of the revolution radius r of the micro object 91 is large ((a) and (c) in FIG. 6). The change of the revolution radius r of the micro object 91 is also large when the trap of the micro particle 91 with the optical vortex is not achieved.

In this way, the micro object control apparatus 1 focuses the optical vortex at each of a plurality of positions in an optical axis method of the objective lens 30 to acquire motion information of the micro object 91, and by comparing the motion information of the micro object 91 at each of the positions, it is possible to evaluate the state of the optical trap of the micro object 91 with the optical vortex. Furthermore, since the micro object control apparatus 1 is capable of evaluating the state of the optical trap of the micro object 91 with the optical vortex, the apparatus is capable of securely performing manipulation of the micro object 91, which has been optically trapped with the optical vortex, and further, the apparatus may also be applied as a driving source of a micro machine, a viscosity measurement, and the like.

Since the micro object control apparatus 1 is capable of continuing to revolve the micro particle 91 at an arbitrary position in the viscosity measurement, it is possible to measure viscosity of the medium 92 easily without introducing a movable portion. In Non-Patent Literature 2, it is reported that a viscous drag value of the medium changes according to a distance between an interface (for example, cover glass) and the micro object. The micro object control apparatus 1 is capable of estimating the viscous drag according to the distance from the interface by a simple method. Furthermore, in Non-Patent Literature 3, it is reported that heat is generated by the optical trap. The micro object control apparatus 1 is capable of estimating a temperature from the viscous drag value.

The micro object control apparatus according to the present invention is not to be limited to the above-described embodiment and configuration example, and various modifications are possible.

The micro object control apparatus according to the above-described embodiment is an apparatus which controls motion of the micro object in the medium, and the apparatus includes a light source that outputs light; an optical vortex generation unit that inputs the light output from the light source and that generates and outputs the optical vortex; an objective lens that optically traps the micro object by focusing the optical vortex output from the optical vortex generation unit and irradiating the micro object in the medium with the focused optical vortex; an imaging unit that images the micro object through the objective lens and outputs image data; an analysis unit that analyzes the motion of the micro object based on the image data output from the imaging unit; and a movement unit that moves the focal position of the optical vortex by the objective lens in the optical axis direction of the objective lens with respect to a sample including the medium and the micro object.

Furthermore, in the micro object control apparatus according to the above-described embodiment, the analysis unit acquires first motion information of the micro object based on the image data output from the imaging unit in which the micro object optically trapped with the optical vortex is imaged by setting the focal position of the optical vortex by the objective lens to a first position by the movement unit; acquires second motion information of the micro object based on the image data output from the imaging unit in which the micro object optically trapped with the optical vortex is imaged by setting the focal position of the optical vortex by the objective lens to a second position different from the first position with respect to the optical axis direction by the movement unit; and evaluates a state of an optical trap of the micro object with the optical vortex by comparing the first motion information and the second motion information.

In the micro object control apparatus with the above-described configuration, it is preferred that the optical vortex generation unit be a spatial light modulator having the plurality of pixels two-dimensionally arrayed, modulating an amplitude and a phase of the light in each of the pixels, and outputting the light. In addition, as the optical vortex generation unit, it is also possible to use an optical element or the like other than the spatial light modulator.

Furthermore, it is preferred that the analysis unit analyze a circular motion or an elliptic motion of the micro object based on the image data output from the imaging unit.

Furthermore, it is preferred that, as each of the first motion information and the second motion information, the analysis unit acquire at least one of the velocity, the angular velocity, the acceleration, the revolution radius, and the physical quantity calculated from these values, of the micro object. Accordingly, it is possible to suitably evaluate the state of the optical trap of the micro object with the optical vortex.

Furthermore, in comparing the first motion information and the second motion information, it is preferred that the analysis unit evaluate whether or not a difference between the first motion information and the second motion information is a predetermined value or less. Furthermore, a method other than the above-described method may also be used in comparing the first motion information and the second motion information.

Furthermore, it is preferred that the movement unit include the piezoelectric element that moves the focal position of the optical vortex. In this case, for example, it is possible to make a fine adjustment of the movement amount of the focal position of the optical vortex by the piezoelectric element.

INDUSTRIAL APPLICABILITY

The present invention is applicable as the micro object control apparatus capable of evaluating the state of the optical trap of the micro object with the optical vortex.

REFERENCE SIGNS LIST

1—micro object control apparatus, 10—light source, 20—optical vortex generation unit, 30 to 33—lens, 40—dichroic mirror, 50—illumination unit, 60—imaging unit, 70—analysis unit, 80—movement unit, 90—sample, 91—micro object, 92—medium, 93, 94—glass plate, 95—spacer.

The invention claimed is:

1. A micro object control apparatus for controlling motion of a micro object in a medium, the apparatus comprising:
a light source configured to output light;
an optical vortex generator configured to input the output light and output an optical vortex;
an objective lens configured to focus the output vortex and irradiate the micro object in the medium with the focused optical vortex to optically trap the micro object;
a camera configured to capture an image of the micro object through the objective lens and output image data;
an analyzer connected to the camera and configured to analyze the motion of the micro object based on the image data output from the camera; and
a movement unit configured to move a focal position of the focused optical vortex by the objective lens in an optical axis direction of the objective lens, wherein
the analyzer
acquires first motion information of the micro object based on the image data output from the camera in which the micro object optically trapped with the optical vortex is imaged by setting the focal position of the optical vortex by the objective lens to a first position by the movement unit,
acquires second motion information of the micro object based on the image data output from the camera in which the micro object optically trapped with the optical vortex is imaged by setting the focal position of the optical vortex by the objective lens to a second position different from the first position with respect to the optical axis direction by the movement unit, and
evaluates a state of an optical trap of the micro object with the optical vortex by comparing the first motion information and the second motion information.

2. The micro object control apparatus according to claim 1, wherein the optical vortex generator is a spatial light modulator having a plurality of pixels two-dimensionally arrayed, modulating an amplitude and a phase of light in each pixel, and outputting the light.

3. The micro object control apparatus according to claim 1, wherein the analyzer analyzes a circular motion or an elliptic motion of the micro object based on the image data output from the camera.

4. The micro object control apparatus according to claim 1, wherein the analyzer acquires, as each of the first motion information and the second motion information, at least any one of a velocity, an angular velocity, an acceleration, a revolution radius, and a physical quantity calculated from these of the micro object.

5. The micro object control apparatus according to claim 1, wherein the analyzer evaluates, in comparing the first motion information and the second motion information, whether or not a difference between the first motion information and the second motion information is a predetermined value or less.

6. The micro object control apparatus according to claim 1, wherein the movement unit includes a piezoelectric element moving the focal position of the optical vortex.

* * * * *